Patented Mar. 16, 1943

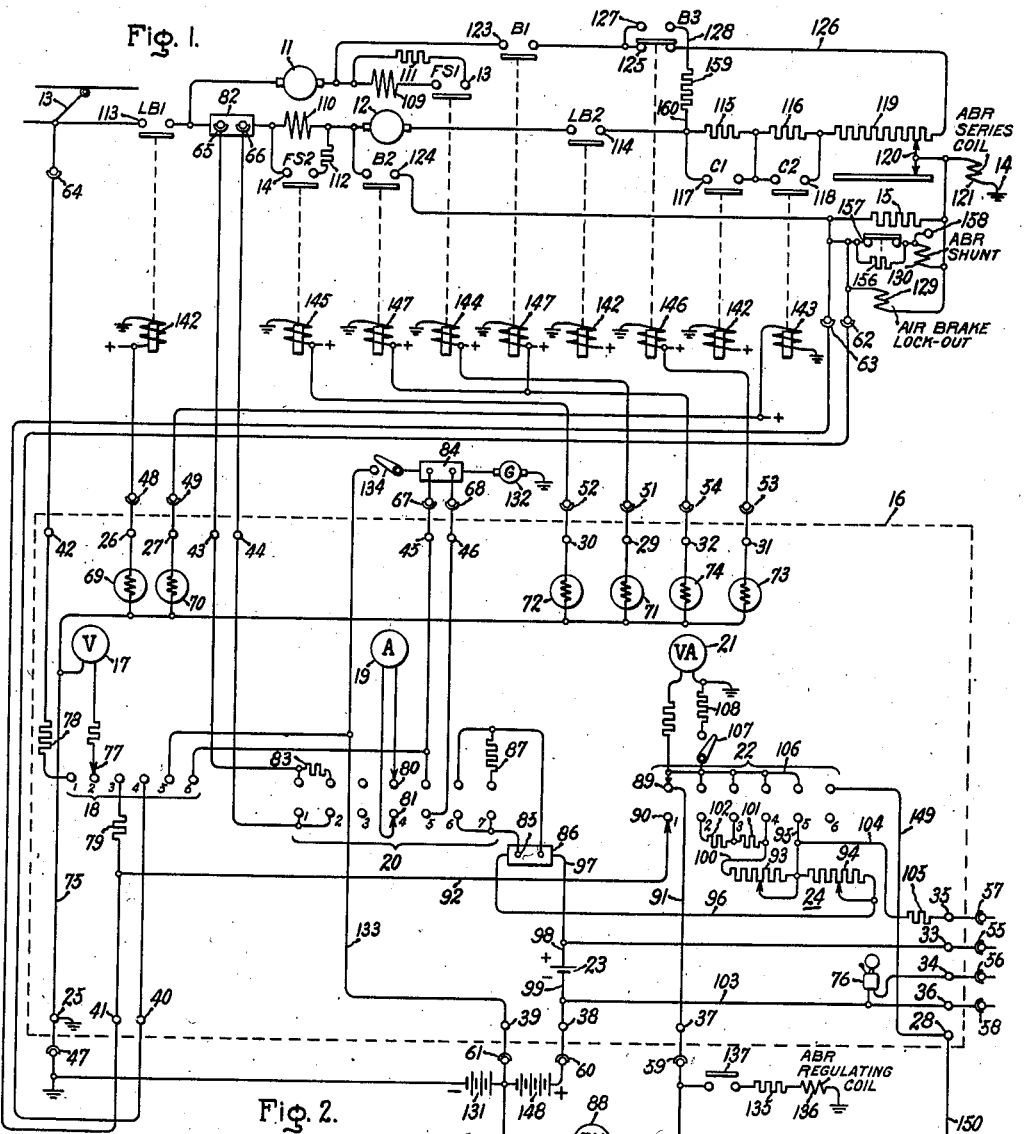

2,314,283

UNITED STATES PATENT OFFICE 2,314,283

RAILWAY CONTROL ANALYZER

Ira W. Lichtenfels, St. Louis, Mo., assignor to General Electric Company, a corporation of New York Application April 29, 1941, Serial No. 390,956

2 Claims. (Cl. 175—183)

My invention relates to indicating and testing apparatus, and concerns particularly apparatus for analyzing the operation and checking the connections of the control apparatus for street-railway or trolley cars.

To meet the demand for improved high speed, smoothly operating electrically driven cars for use on street-railways, an automatic railway control has been developed. The motors respond to the joint action of manual controllers and a controlling variable resistor operated by a pilot motor. The pilot motor, in turn, is controlled in part by settings of the master controller and by an accelerating and braking relay. The connections are made for the most part by means of contactors operated by the controllers or relays, and suitable windings and interlocks for protective and automatic sequence determining purposes are employed. A car control system of the foregoing type has been approved by the conference of presidents of car builders and is referred to, for convenience, as the PCC type of car control. Owing to the numerous operating windings, contactors, and automatically operated elements employed, it is important that all of the connections be properly made and that the apparatus be carefully checked before a car employing control of the PCC type is placed in service. It is, therefore, an object of my invention to provide a portable analyzing and checking apparatus, by means of which PCC car controls may easily be checked and have their settings adjusted, and which may successfully be employed by persons with relatively little technical knowledge and with relatively little experience.

It is an object of my invention to provide an analyzing and checking arrangement which does not necessitate the breaking of any connections of the car control and which involves merely the placing of clearly marked test clips on readily located terminals of the car control system. Other and further objects and advantages will become apparent as description proceeds.

In carrying out my invention in its preferred form, I provide a suitable portable enclosing case containing a multi-range voltmeter, a multi-range ammeter, a volt-ammeter, adjustable resistors for testing, suitable changeover and test switches, the necessary multipliers and shunts, and signal lights for observing contactor operation sequence. The analyzer has a plurality of terminals connected to leads having test clips at their ends adapted to be connected at predetermined points in the car control system. The connections are such that by operating the voltmeter changeover switch, the voltages at various important points in the system are obtained in order, and the ammeter similarly has a changeover switch arranged for measuring the current at various points of the control system. The connections are such that by operation of the test switch, currents of various predetermined values are applied to certain contactor or relay coils, and the variations in voltage and current in the affected portions of the apparatus are observable from the voltmeter and ammeter as the test switch is operated. The volt-ammeter is so arranged that it automatically gives a reading, first, of the voltage applied to the pilot motor at standstill and then the current therein for successive conditions of operation while running.

A better understanding of the invention will be afforded by the following detailed description when considered in connection with the accompanying drawing and those features of the invention which are believed to be novel and patentable will be pointed out in the claims appended hereto. In the drawing, Fig. 1 is a circuit diagram schematically representing a checker and analyzer, forming an embodiment of my invention, together with certain of the essential elements of a railway car control. Fig. 2 is a sequence table representing the sequence of operation of contactors in a car control, the operation of which is to be analyzed and checked.

In the description and the drawing, reference is made to a car control having two driving motors in parallel, each with series fields and field shunting contactors. Ordinarily a greater number of motors would be employed, for example, four motors connected in series parallel. Additional field shunting resistors and contactors, not shown, would ordinarily be employed, also, in order to increase the smoothness of operation. However, to simplify the drawing and the explanation, such additional motors and field shunting contactors have been omitted together with other features of the car control not absolutely essential to the understanding of the principle of operation of my analyzer and checker.

The car control system

The car is driven by a pair of motors or a pair of groups of motors, 11 and 12, supplied with energy by an overhead trolley 13 and grounded at 14 to complete the power circuit. The motors 11 and 12 are arranged to be permanently connected in parallel. They are controlled by connecting more or less resistance in shunt with their fields, and by varying the amount of resistance connected in series with the motors. Dynamic braking is obtained by disconnecting the motors from the trolley and reconnecting the motors to pass current through a braking resistor 15. The necessary changes in the motor connections are made by means of contactors such as LB1, LB2, B1, B2, etc., to which more specific reference will be made hereinafter, and the contactors, in turn, are controlled by means of controllers not shown. My invention does not relate to the control per se although various parts thereof are schematically represented in the drawing in order that the operation of my analyzer and checker may be explained.

*The analyzer and checker*

The analyzer and checker illustrated in Fig. 1 comprises a casing containing the parts shown within the dotted rectangle 16. These parts include a voltmeter 17 with a changeover switch 18 therefor, an ammeter 19 with a changeover switch 20 therefor, a volt-ammeter 21, a changeover and testing switch 22, a test battery 23, a testing resistor 24, a panel supporting the instruments and switches, and certain other parts to which more specific reference will be made hereinafter.

For making connections to the control system to be tested, there is a plurality of terminals 25 to 46, inclusive. The terminal 25 is the ground terminal to which all ground connections of the analyzer are internally grounded and which is adapted to be connected to a grounded point in the control system being tested. Each of the terminals 25 to 46 is adapted to have a flexible lead connected thereto, at the end of which there is a test clip, which may conveniently be electrically connected to suitable points in the car control system. The test clips corresponding to the analyzer terminals 25 to 46 are designated by the symbols 47 to 68 respectively.

Mounted upon the panel are, also, signal lamps 69 to 74 inclusive, for indicating the operation of various contactors of the car control system and showing the sequence in which the contactors operate. These lamps are connected between a ground conductor 75 and terminals 26, 27, 29—32 to which the test clips 48, 49, 51 to 54 are respectively connected. There is, also, a test bell 76 for testing the continuity of electrical circuits.

The voltmeter 17 has one terminal connected to the ground conductor 75 which is, in turn, connected to the ground terminal 25. The other terminal of the voltmeter 17 is connected to a movable tap 77 of the change-over switch 18 which has six stationary contacts in positions numbered 1 to 6 inclusive. The stationary contact in position 1 is connected through a suitable multiplier 78 to the analyzer terminal 42 for measuring trolly voltage. Position 2 is the off position of the voltmeter 17 and is interposed between the trolley-voltage measuring position and the other positions for insulation of the 600 volt trolley terminal from the other stationary terminals of the voltmeter changeover switch. The stationary contact 3 of the changeover switch 18 is connected through a multiplier 79 to the analyzer terminal 41 for measuring the spotting voltage across the breaking resistor of the control. The stationary contact 4 is connected to the analyzer terminal 40 for measuring voltage in an air brake lock-out circuit, and the stationary contacts 5 and 6 are connected to the analyzer terminals 39 and 45 respectively, for measuring battery voltage and generator voltage of the car control system.

The ammeter 19 has its two terminals connected to a pair of contacts 80 and 81 of the ammeter changeover switch 20. The contacts 80 and 81 are connected so as to be movable together over seven pairs of stationary contacts of the changeover switch 20, these pairs of contacts being designated by the numerals of seven different positions. The contacts in position 1 are electrically connected to terminals 43 and 44 of the analyzer for measuring the motor current through a car shunt 82. The stationary contacts of the changeover switch 20 in position 2 are also connected to the terminals 43 and 44 but through a multiplier 83, which changes the ammeter range from 0–500 to 0–1000 amperes. The contacts in positions 3 and 4 are dead in order to provide an off position between the 600 volt contacts 1 and 2 and the other contacts of the changeover switch 20. The stationary contacts in position 5 of the changeover switch 20 are connected to the analyzer terminals 45 and 46 for measuring the generator current through a generator shunt 84. The stationary contacts in position 6 are connected to the potential-difference terminals 85 of a shunt 86 contained within the casing 16 of the analyzer for measuring various other currents in the range from 0 to 1 ampere. The contacts in position 7 are, also, connected to the internal shunt 86 but through a multiplier 87 for changing the ammeter range from 0–1 to 0–5 amperes.

The volt-ammeter 21 has one terminal grounded and the other terminal connected to the analyzer terminal 37 for measuring voltage or current of a pilot motor 88 of the car control system.

The testing changeover switch 22 has a pair of movable contacts 89 and 90. The contacts 89 and 90 are mechanically connected and movable together over six pairs of stationary contacts of the changeover switch 22, indicated by the numbers of their positions 1 to 6 inclusive. The movable contacts 89 and 90 are connected through a pair of conductors 91 and 92 to the analyzer terminals 37 and 41 respectively, for causing the volt-ammeter 21 to give indications of the pilot motor operation under various test conditions brought about by the shifting of the movable contacts 89 and 90 of the changeover switch 22 to vary the setting of a relay ABR, which controls the shunting of the pilot motor armature 88. The contact 89 is for selecting the winding of the pilot motor circuit and the contact 90 for selecting the current magnitude applied to the shunt coil 130 for the accelerating and braking relay ABR.

Associated with the changeover switch 22 is the resistor 24 having two adjustable sections 93 and 94 connected in series. In order that the adjustable resistor 24 may be used for controlling current flowing in an element connected between the analyzer terminals 38 and 41 and the ammeter 19 may be used for measuring such current, the resistor 24 and the ammeter shunt 86 are connected in series to the terminals 38 and 41. The common terminal of the sections 93 and 94 is connected through a conductor 95 to the lower stationary contact in position 5 of the changeover switch 22. The end terminal of section 94 of the resistor 24 is connected to a conductor 96, which is connected to one of the current terminals of the ammeter shunt 86, the other current terminal of which is connected through conductors 97 and 98 to the positive electrode of the battery 23. The negative terminal of the battery 23 is connected through the conductor 99 to the analyzer terminal 38. The test clip 60 leading from the terminals 38 is adapted to be connected to the positive terminal of an extra battery 148 connected in series with the regular car battery 131. The test clip 63 leading from the terminal 41 is adapted to be connected to the ungrounded terminal of a selected element such as the braking resistor 15 or the relay coil 130 in which current is to be measured while testing. The aforesaid connection of the test clips 60 and 63, connects the three batteries 23, 148 and 131 in series to provide adequate voltage for the test. For changing the current passed through the tested device, additional positions 4, 3 and 2 of the changeover switch 22 are provided. The lower stationary contact in position 4 is connected through a conductor 100 to the left-hand end terminal of the section 93 of the resistor 24. The lower stationary contacts of the changeover switch 22 in positions 3 and 2 are, also, connected to the left-hand end of the resistor 24 but through additional resistances 101 and 102, respectively, for further reducing the test current.

The analyzer terminal 38 is, also, connected through a conductor 103 (and the conductor 99) to the analyzer terminal 36, and the common terminal of resistor sections 93 and 94 is connected, also, through a conductor 104 and a calibrated resistor 105 to the analyzer terminal 35 for the measurement of resistances of elements to which the test clips 57 and 58 from the analyzer terminals 35 and 36 may be connected.

The upper stationary contacts in positions 1, 2, 3, 4 and 5 of the testing changeover switch 22 are connected to a conductor 106, a relay test switch 107 and a loading resistor 108 for introducing an additional load across the analzer terminal 37 to draw additional current from the circuit of the pilot motor 88 when making certain tests upon relays controlling the pilot motor 88. The upper stationary contact in position 6 is connected through a conductor 149 to the analyzer terminal 29, to which the test clip 59 is electrically connected through a flexible conductor 150.

For locating troubles arising from improper positioning of the brush arm 120 (of a part of the car controls which will be described hereinafter) for adjusting the series resistance of the car motors 11 and 12, a potentiometer 151 may be provided. The potentiometer is connected on one side to ground and on the other, electrically connectable through a conductor 153 to the positive side of the battery 131. The potentiometer has a movable tap 152 electrically connected to a terminal 154 for receiving the test clip 59 and is adapted to be mechanically coupled through suitable linkage such as a gear reduction, represented schematically by a dashed line 155, to the armature 88 of the pilot motor PM. The gear reduction 155 is removably connectable by any suitable mechanism, not constituting a part of my invention to the shaft of the pilot motor PM.

*Details of car control*

In the type of car control system for the testing of which my analyzers are particularly adapted, the driving motors 11 and 12 are permanently connected in parallel having series field windings 109 and 110 respectively, connected in series wherewith. The field windings have field shunting resistors 111 and 112, respectively, which are adapted to be connected in shunt with the respective fields for motor control purposes. Each of the field shunting resistors 111 and 112 may be divided into one or more sections, only one of which is shown for the sake of simplicity, adapted to be connected progressively in shunt with the field windings 109 and 110. For shunting the field 109, one or more field shunting switches FS1 with normally open contacts 13 are provided for progressively connecting shunting resistance, but for the sake of simplicity only one field shunting switch is illustrated. Similarly in the case of the motor field 110, one or more field shunting switches FS2 with normally open contacts 14 are provided for connecting the field shunting resistor 112 or sections thereof not shown, across the motor field 110. Line breakers LB1 and LB2, having normally open contacts 113 and 114, are provided for connecting the motors 11 and 12 across the line for motoring operation. For cushioning the application of power, cushioning resistors 115 and 116 are provided connected in series with the motor energizing circuit and adapted to be cut out in sequence by cushioning contactors C1 and C2 having normally open contacts 117 and 118 respectively. For controlling the acceleration of the motors 11 and 12, an accelerating rheostat or adjustable resistor is provided consisting of a tapped resistor 119 and a motor driven movable contact 120; the armature 88 of the pilot motor 10 being mechanically connected to the movable contact 120. For automatically regulating the speed of the pilot motor armature 88, an accelerating and breaking relay ABR is provided having a series coil 121 in series with the rheostat 119.

For obtaining dynamic braking, the braking resistor 15 is provided, and for reconnecting the motors across the braking resistor 15, a pair of braking contactors B1 and B2 with normally open contacts 123 and 124, respectively, is provided. For increasing the range of control for the dynamic braking connection, a third braking contactor B3 is provided having a normally closed stationary contact 125 connected to the right-hand end of the variable resistor 119 through the conductor 126 and a normally open stationary contact 127 connected through conductor 128 to resistor 159 through conductor 160 to the left-hand end of the cushioning resistor 115. For preventing the operation of the air brakes (not shown) when dynamic braking is effective, an air brake lock-out mechanism is provided having a lock-out coil 129 connected across the braking resistor 15. For automatically regulating the speed with which the pilot motor varies the resistance of the resistor 120 during dynamic braking, the accelerating and braking relay ABR is provided with a shunt coil 130 which is also connected across the braking resistor 15.

The car control system includes, also, a storage battery 131 for energizing the various contactors and relays and the armature 88 of the pilot motor PM. The battery 131 is grouned on the negative side and connected on the positive side to the pilot motor armature 88. For charging the battery 131 there is a generator 132 grounded on one side, connected on the other side to one of the current terminals of the generator shunt 84, the other current terminal of which is connected by means of a conductor 133 to the positive terminal to the battery 131, the generator switch 134 being interposed in the connection. In case the car control system does not normally have a generator shunt, one of the generator fuses may be replaced by a special combination fuse-and-shunt. However, this is the only change in connections of the control which needs to be made for employing my analyzer for checking operations of the standard PCC car control system.

As previously mentioned, the pilot motor armature 88 is connected on the positive side to the battery 131. The other side of the armature 88 is grounded through a resistor 135, a regulating coil 136 of the accelerating and braking relay ABR, and a normally open switch 137.

The car control system includes, also, other suitable elements to which no specific reference need be made since their operation is not directly involved in the analysis to be made. Manually operated controllers are employed for energizing windings of certain contactors and for initiating the operation of other contactors and the pilot motor PM, which are controlled by interlocks or relays. The controllers, however, are not shown in the drawing since the proper operation of the controllers is checked by observing the operation of the contactors, pilot motor and other elements of the car control system which are shown in the drawing. The manner in which the controllers effect the change in operation of the contacts need not be explained. However, the various positions of the controllers and the contactors which are energized in the various positions are indicated in the sequence table of Fig. 2. In order to facilitate the understanding of the principle of operation of my analyzer, it should be pointed out that in the type of control represented in the drawing, the motion of the movable tap 120 of the accelerating resistor 119 takes place automatically and the speed of operation is regulated by the accelerating and braking relay ABR which has, in addition to the series winding 121, the shunt winding 130 and the regulating winding 136 already mentioned, a movable contactor 138, and a group of stationary contactors 139 connected to taps of a resistor 140, by means of which the accelerating and braking relay ABR may shunt portions of the resistor 140 across the armature 88 of the pilot motor PM to modify the speed thereof. The accelerating and braking relay has a bias spring 141 opposing the force of the series and shunt coils 121 and 130, which spring tends to prevent shunting of the pilot motor 88. However, if the current drawn by the motors 11 and 12 is excessive, the current through the coil 121 during motoring and through the coil 130 during dynamic braking overcomes the biasing spring 141 sufficiently to by-pass some of the current from the armature 88 and thus prevent the cutting out of the accelerating resistor 119 too rapidly. For regulating purposes, the regulating coil 136 is so connected as to oppose the action of the coils 121 and 130. There are, also, reversing switches (not shown) for causing the pilot motor 88 to run in one direction or another according to the accelerating or braking demands of the car operator determined by the setting of the controllers. The switch 137 in the pilot motor circuit constitutes one of the interlocks of the controllers.

The car control may include a ballast resistor 156 in series with the ABR shunt coil 130, and a normally closed contactor 157 shunting the resistor 156. The contactor 157 opens under certain circumstances such as going from coasting to brake application.

*The manner of using the checker and analyzer*

When a car control system is to be adjusted and checked by means of my analyzer, it is first completely wired in the manner which is believed to be correct. Without breaking any connections therein, various test clips from terminals of my analyzer are connected to the proper points in the car control system as shown in the drawing. For example, the test clip 64 is connected to the trolley terminal of the control. The test clips 65 and 66 are connected to the potential difference terminals of the car shunt 82. The test clip 63 is connected to the positive terminal of the shunt coil 130 of the accelerating relay ABR, which is also the positive terminal of the breaking resistor 15. The test clip 62 is electrically connected to a point which is the same in electrical effect if the control connections are properly made. However, in order to check these connections, the test clip 62 is connected to the actual positive terminal of the air brake lock-out coil 129. The test clips 48 and 49, and 51 to 54 are connected to the positive ends of the operating coils 142 to 147, respectively, of the various contactors shown in the drawing. In making certain tests it is desirable to have an additional storage battery 148 and this is connected between the analyzer terminals 39 and 38 with the negative terminal of the storage battery 148 connected to the analyzer terminal 39 which is also connected by means of a test clip 61 to the positive terminal of the battery 131 which is already a part of the car control system.

It will be evident that the voltages on the trolley, the air brake lock-out system, the battery and the generator are measured by moving the changeover switch 18 of the voltmeter 17 to the positions 1, 4, 5 and 6 respectively. In a similar manner, the spotting voltage across the braking resistor 15 is measured with the voltmeter changeover switch in position 3. The car speed at which the dynamic brake fades out is also indicated by the voltage measured in either positions 3 or 4.

The motor current is measured by placing the ammeter changeover switch 20 in either position 1 or 2 according to the desired current range of the ammeter. In a similar manner, the generator current is measured with the ammeter switch 20 in the position 5.

The operation of the pilot motor 88 is checked by means of the volt-ammeter 21. With the foot controller (not shown) in the off position in which the switch 137 is open, a circuit is established from the positive terminal of the battery 131, through the armature 88 of the pilot motor PM, through the test clip 59, terminal 37, conductor 91, and the volt-ammeter 21; both the negative side of the battery 131 and remaining terminal of the volt-ammeter 21 being grounded. Accordingly, the reading of the instrument 21 gives the voltage applied to the pilot motor armature 88 when it is not running. When the switch 137 is closed causing the pilot motor armature 88 to start running, the instrument 21 is actuated by the IR drop in the resistor 135 and the deflection of the instrument 21, therefore, indicates with sufficient accuracy, the current flowing in the pilot motor armature 88. By means of the instrument 21, therefore, the manner in which the pilot motor 88 comes up to speed may be observed and since the instrument pointer has already been deflected for the voltmeter reading, instantaneous current values are measured without the hindrance of inertia effect of the instrument pointer. Furthermore, no matter what error may be made in the car wiring, the instrument 21 cannot be damaged by excessive deflection.

The proper operation of the various contactors in response to the controllers (not shown) is checked by observing the lamps 69 to 74 to determine whether they light up in a sequence prescribed by the sequence table of Fig. 2. In actual car control systems it may, also, be desirable to have additional contactors (not shown) controlled by interlocks or relays or additional controller positions; and the sequential operations of such additional contactors would also be indicated by additional signal lamps which would be provided together with additional test clips.

Circuit continuity may be tested by means of the test bell 76 with the test clips 55 and 56 connected between the two points between which continuity is to be checked. It will be observed that for such a test, a circuit is provided from the positive terminal of the cell 23 through the conductor 98, the analyzer terminal 33, the test clip 55, the circuit or element to be tested, the test clip 56, the analyzer terminal 34, the bell 76, the conductor 103 and the conductor 99, back to the cell 23.

In making resistance measurements, for example, in determining whether any sections of the accelerating resistor 119 are shorted, the test clips 57 and 58 are placed across the section of resistance which is to be measured. With the test switch 22 in its position 5, a circuit is then formed from the positive terminal of the battery 23 through the conductor 98, the conductor 97, the internal ammeter shunt 86, the conductor 96, the section 94 of the resistor 24, the conductor 104, the resistor 105, the analyzer terminal 35, the test clip 57, through the element, the resistance of which is to be measured, the test clip 58, the analyzer terminal 36, the conductor 103 and the conductor 99 back to the cell 23. The reading of the ammeter 19 in positions 6 or 7 of the ammeter changeover switch 20 then gives the reading of the resistance desired. The calibration of the ohmmeter, formed by the resistors 94 and 105, and the ammeter 19, may be checked by connecting the test clips 57 and 58 together and adjusting the resistor 94 to give a reading of one ampere in the ammeter 19. This reading corresponds to 0 tested ohms and the increase of resistance in the test circuit, by connection of a resistance to the test clips 57 and 58, can be changed to ohms recognizing the value of the total circuit resistance which is 1.5 ohms with the test clips 57 and 58 connected together and a battery voltage of 1.5 volts. The operation of the movable contactor 120 of the accelerating resistor 119 may be checked by means of the foregoing circuit with one of the test clips 57 and 58 connected to the movable contact 120 and the other test clip connected to the end of the resistor 119.

For testing the accelerating and braking relay ABR or for adjusting it, current is passed through the shunt coil 130 of the relay and the extra battery 148 is employed, current being varied by means of the changeover testing switch 22; using any of the positions from 2 to 5 of the switch 22 according to the amount of current desired. In order to permit the use of light test leads by reducing the current drawn, the clip 63 may be connected directly to the positive terminal 158 of the coil 130 and a piece of insulation may be slipped under the contacts 157 for placing the resistor 155 in series with the brake resistor 15. For this test there is a circuit from the positive terminal of the cell 23, through the conductor 98, the conductor 97, the ammeter shunt 86, the conductor 96, section 94 of the resistor 24, one or more of the resistors 93, 101 and 102 according to the setting of the switch 22, the movable contact 90, the conductor 92, the analyzer terminal 41, the test clip 63, through the shunt coil 130 of accelerating and braking relay ABR, to ground through the negligible resistance series coil 121, to the negative terminal of the main battery 131, through the main battery 131 to the test clip 61, the terminal 39, through the extra battery 148, to the test clip 60, the analyzer terminal 38, through the conductor 99, and the cell 23, back to the starting point which was the positive terminal of the cell 23. The current in the winding 130 measured by the ammeter 19 is adjusted by means of the adjustment of the sections 93 and 94 of the resistor 24 to obtain operation of the relay at current values prescribed as standard by the manufacturer of the relay. Adjustment of the relay ABR for the accelerating connection of the control is made with the switch 22 in position 5 utilizing only the resistor section 94. The adjustment of the braking connection of the control is made with the switch 22 in position 4, and adjustment of the coasting connections is made with the switch 22 in positions of 3 and 2, interposing resistances 101 and 102 respectively.

The pick-up and dropout of the accelerating and braking relay may be checked from inside the car by closing and opening the switch 107 which connects an additional load, approximately 36 ohms of the resistance 106, across the analyzer terminal 37 to ground thus varying the drop across the armature 68 of the pilot motor PM when the contact 138 of the relay ABR opens or closes, thereby causing the reading of the voltammeter 21 to change.

The pick-up or dropout of any of the various contactors of the car control apparatus may also be checked. The test clip 60 may be connected to the positive terminal of the main battery 131. The test clip 63 from the analyzer terminal 41 is disconnected from the shunt coil 130 of the accelerating and braking relay ABR and is connected instead to the positive terminal of the operating coil of the contactor to be tested. The coil current is regulated by means of the variable resistances 93 and 94 as previously discussed, and the current is read on either 0–1 or 0–5 scales of the ammeter 19. The test is made with the controllers in the "off" position so that the contactor coil under test is energized only through the test clip 63. The proper operation, including the sequence of operation of the contactors, is checked by observing the lighting up of the signal lamps 69—74. The lamp 69 indicates the operation of the contactors LB1, LB2 and C1 since these have a common energizing source. The operation of the contactors C2, FS1, FS2 and B3 is indicated by the signal lamps 70 to 73, respectively. The operation of the contactors B1 and B2, having a common energizing winding, is indicated by the signal lamp 74.

It will be understood that various procedures may be successfully employed in checking the operation of a car control by means of my analyzer. I have found that a convenient procedure consists of taking the various readings in order with the controller in various positions indicated by the contact sequence table, Fig. 2, and tabulating the measurements obtained as indicated in the following table of illustrative test readings.

| Car oper. | Line volts | Total motor amps. | Spot volts | P. M. amps. | L. O. volts | Cont. seq. | Gen. volts | Gen. amps. |
|---|---|---|---|---|---|---|---|---|
| Switch | 500 | 210 | | 5-7 | | O. K. | 35 | 38 |
| Accel | 450 | 485 | | 3-8 | | O. K. | 35 | 40 |
| Coast | | 42 | 15 | 5-7 | 34 | O. K. | 36 | 38 |
| Brake | | 350 | 35 | 3-8 | 35 | O. K. | 33 | 52 |
| Stopped | | | | | | O. K. | 36 | 30 |

Volts: Gen. only 36; Batt. only 33=max. charge 36.

Relay check: Brake—.575; acceleration—.640; coast—.180.

Controller speed: A–B—1¼ sec.; B–A—1¼ sec.

I have herein shown and partially described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States, is:

1. A railway control analyzer circuit comprising a pilot motor having a pair of terminals, one of which is referred to as a ground terminal, a current source having a pair of terminals, one of which is grounded, a connection between the ungrounded terminal of said pilot motor and said current source, a calibrated resistor connected in a ground lead between the grounded terminal of the current source and the ground terminal of the pilot motor, a current-responsive instrument connected on one side to the grounded terminal of the current source and adapted to be connected on the other side to the ground terminal of the pilot motor and a switch interposed between the ground terminal of said pilot motor and said resistor, whereby said instrument measures voltage applied to said motor before the switch is closed and measures current therein after the switch is closed.

2. An analyzer for checking the operation of the accelerating and braking relay of a railway car control system having a pilot motor with an ungrounded terminal and a ground terminal with a normally open switch interposed between the ground terminal and ground, a current source grounded on one side and connected on the other side to the ungrounded terminal of the pilot motor and an accelerating and braking relay with a shunt operating coil and with movable contacts connected across the pilot motor, said analyzer comprising a supplementary current source, an ammeter, a volt-ammeter, a loading resistor, conductors for connecting a relay shunt coil in series with said ammeter to said supplementary current source, conductors for connecting the loading resistor between ground and the ground terminal of the pilot motor, said volt-ammeter being connected across the loading resistor whereby pick-up of the relay closes its contact to shunt the pilot motor and increase the current flow through the said loading resistor thereby lowering the volt-ammeter reading and dropout of the relay opens its contacts to cause a rise of the volt-ammeter reading, for indicating pick-up and dropout respectively of the accelerating and braking relay while it is being checked.

IRA W. LICHTENFELS.